| (12) | United States Patent | (10) Patent No.: | US 7,697,479 B2 |
|---|---|---|---|
| | Metke et al. | (45) Date of Patent: | Apr. 13, 2010 |

(54) SELF-LEARNING GEOGRAPHICALLY AWARE HANDOFF METHOD AND SYSTEM

(75) Inventors: Anthony R. Metke, Naperville, IL (US); Randy L. Ekl, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 1208 days.

(21) Appl. No.: 11/100,754

(22) Filed: Apr. 7, 2005

(65) Prior Publication Data

US 2006/0227744 A1 Oct. 12, 2006

(51) Int. Cl.
*H04W 4/00* (2009.01)

(52) U.S. Cl. .................. 370/331; 370/330; 370/332; 370/401; 455/436; 455/452.2

(58) Field of Classification Search ................ 370/331, 370/328, 329, 330, 332, 352, 401, 475; 455/436, 455/439, 440, 442, 443, 446, 452.1, 456.1, 455/525

See application file for complete search history.

(56) References Cited

U.S. PATENT DOCUMENTS

| 5,432,842 | A | | 7/1995 | Kinoshita et al. | |
|---|---|---|---|---|---|
| 5,854,981 | A | * | 12/1998 | Wallstedt et al. | ............ 455/439 |
| 6,061,337 | A | | 5/2000 | Light | |
| 6,321,090 | B1 | * | 11/2001 | Soliman | ..................... 455/440 |
| 6,631,263 | B1 | | 10/2003 | Corkery | |
| 7,039,406 | B2 | * | 5/2006 | Ishiguro et al. | ............. 455/436 |
| 2003/0087646 | A1 | | 5/2003 | Funato | |
| 2004/0203831 | A1 | * | 10/2004 | Khan | ..................... 455/452.2 |

OTHER PUBLICATIONS

GB Examination Report Dated Jan. 12, 2009.
PCT Search Report Dated Aug. 11, 2006.

* cited by examiner

*Primary Examiner*—Matthew D Anderson
*Assistant Examiner*—Shaima Q Aminzay
(74) *Attorney, Agent, or Firm*—Indira Saladi; Anthony P. Curtis (57) ABSTRACT

A self-learning geographically aware handoff method and system is disclosed. The system includes a handoff manager (108), which receives information about a position and movement of the mobile nodes (102a, 102b, 102c and 102d) present in the mobile network (100). The handoff manager learns the coverage capabilities of the access points (104a, 104b, 104c and 104d) in the mobile network. It then determines a second access point, to which a mobile node will handoff to, based on the learned coverage capabilities. The handoff manager then informs the mobile node about the second access point.

22 Claims, 6 Drawing Sheets

| H3 | H2 | H1 | Prediction | Frequency |
|------|------|------|------------|-----------|
| 302a | 302b | 302c | 302d | 1.00 |
| 302b | 302c | 302d | 302e | 0.66 |
| 302g | 302i | 302k | 302f | 0.34 |
|  |  |  |  |  |

SELF-LEARNING GEOGRAPHICALLY AWARE HANDOFF METHOD AND SYSTEM

FIELD OF THE INVENTION

This invention relates in general to a mobile network, and more specifically to handoff of a mobile node in a mobile network.

BACKGROUND OF THE INVENTION

In a mobile network, a mobile node may be constantly moving from one cell served by one access point to a second cell served by a different access point. In order to enable the mobile node to constantly interact with other mobile nodes, it is essential to maintain communication between the mobile node and at least one access point in the mobile network. The process of handing over a communication link from one access point to another is known as handoff.

The most common criteria for determining the need for a handoff are Received Signal Strength (RSS) and/or Signal to Noise Ratio (SNR). When a mobile node shifts from one cell to another, it registers a drop in RSS and/or SNR. The mobile node then scans for a new access point, which can provide service to the mobile node in the new cell. Upon finding the new access point, the mobile node interacts with it and uses its services.

However, the method of handoff, as described, suffers from a number of limitations. First, the method may not always be able to achieve a smooth handoff. For example, if the mobile node starts scanning early (while it is still in contact with an old access point), it may discover a new access point. The mobile node may then loose connectivity to the new access point, while still being able to talk to the old access point. The mobile node then has to scan again, resulting in wastage of battery and network resources. If the mobile node starts scanning late, it may not be able to discover a new access point even after loosing connectivity with the old access point. This results in inefficiencies in the handoff process.

Second, there are certain areas in a mobile network where RSS and SNR decrease rapidly with very short movement. In other areas, they may decrease and increase alternately with straight-line movement. In such areas, the use of RSS and SNR values for deciding the need of handoff can make the process inefficient.

Accordingly, there is a need for an improved handoff method and system.

BRIEF DESCRIPTION OF THE DRAWINGS

In the accompanying figures, like reference numerals refer to identical or functionally similar elements throughout the separate views. These, together with the detailed description below, are incorporated in and form part of the specification, and serve to further illustrate the embodiments and explain various principles and advantages, in accordance with the present invention.

DETAILED DESCRIPTION

The present disclosure is provided to further explain in an enabling manner the best modes of making and using various embodiments, in accordance with the present invention. The disclosure is also given to enhance the perception and appreciation of the inventive principles and advantages thereof, rather than to limit in any manner the invention. The invention is defined solely by the appended claims, including any amendments made during the pendency of this application and all equivalents of the claims, as issued.

It is further understood that the use of relational terms, if any, such as first and second, top and bottom, and the like, are used solely to distinguish one entity or action from another, without necessarily requiring or implying any actual relationship or order between such entities or actions.

Figure 1:
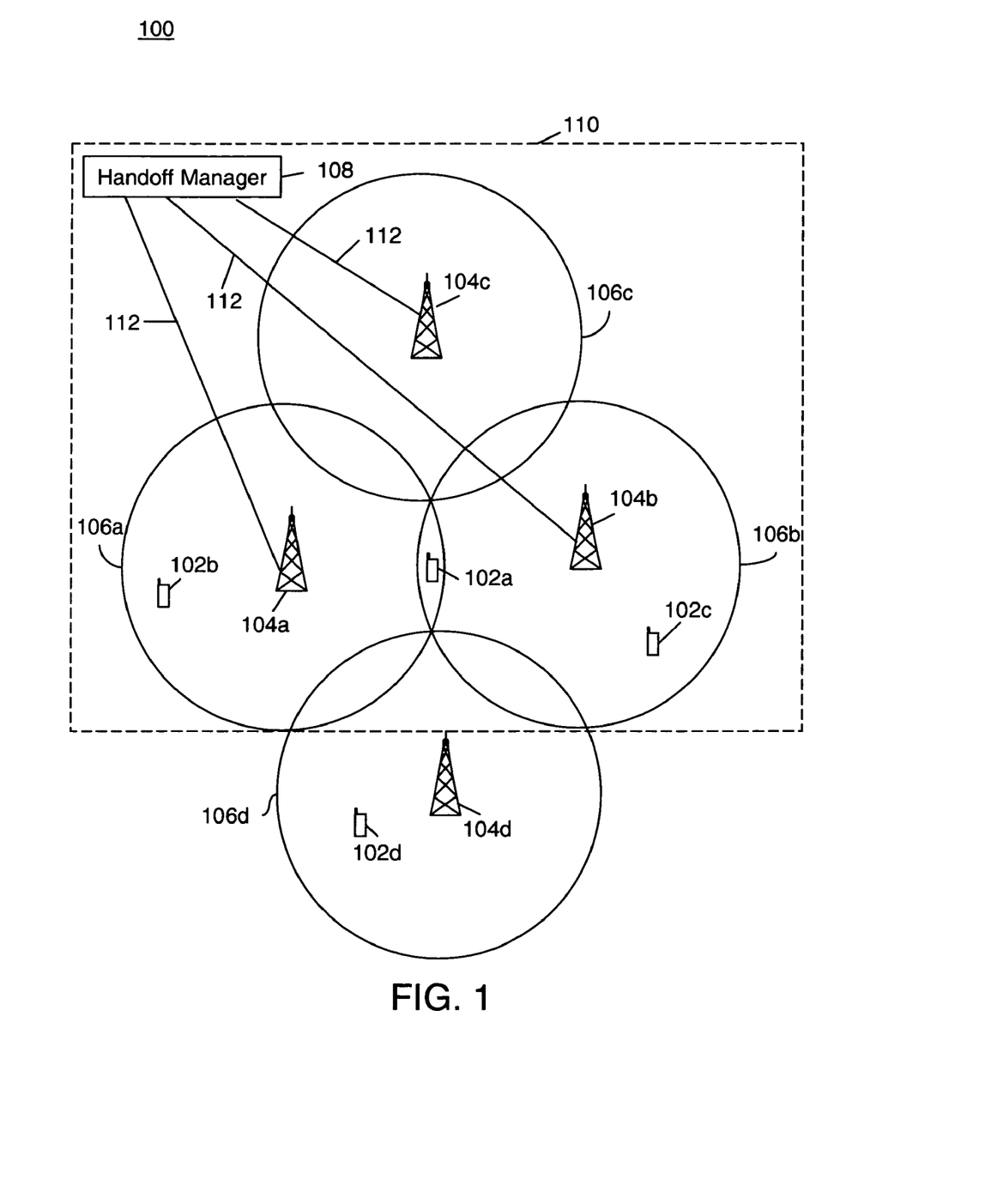
FIG. 1 illustrates a mobile network, in accordance with an exemplary embodiment of the present invention.

FIG. 1 illustrates a mobile network 100, in accordance with an exemplary embodiment of the present invention. The mobile network 100 includes mobile nodes 102a, 102b, 102c, and 102d and access points 104a, 104b, 104c, and 104d. Hereinafter, the mobile nodes 102a, 102b, 102c, and 102d are referred to as a plurality of mobile nodes 102. Also, the access points 104a, 104b, 104c, and 104d are referred to as a plurality of access points 104. The mobile network 100 is divided into cells 106a, 106b, 106c, and 106d. The cells 106a, 106b, 106c, and 106d are hereinafter referred to as a plurality of cells 106. Referring to FIG. 1, even though the geographic area is shown as a rectangle and cells are shown as circles, both the geographic area and the cell may be of arbitrary shape. Each cell of the plurality of cells 106 is served by one of the plurality of access points 104. For example, the access point 104a provides a communication channel to the mobile node 102a in the cell 106a. This communication channel enables the mobile node 102a to communicate with other mobile nodes in the mobile network 100.

When the mobile node 102a moves from the cell 106a to any neighbouring cell, e.g. cell 106b, the received signal strength (RSS) of the access point 104a may become insufficient to support communication with the mobile node 102a. As a result, the mobile node 102a may establish communication with the access point 104b in the cell 106b. This process of handoff of the mobile node 102a is coordinated by a handoff manager 108 in the mobile network 100. The handoff manager 108 coordinates the handoff in a geographic area 110 in the mobile network 100. The geographic area 110 includes at least one cell of the plurality of cells 106, in accordance with an embodiment of the present invention. The handoff manager 108 communicates with the plurality of access points 104 in the geographic area 110 through a communication channel 112. The communication channel 112 may be a wire line or a wire less communication channel, in accordance with various embodiments of the invention.

Figure 2:
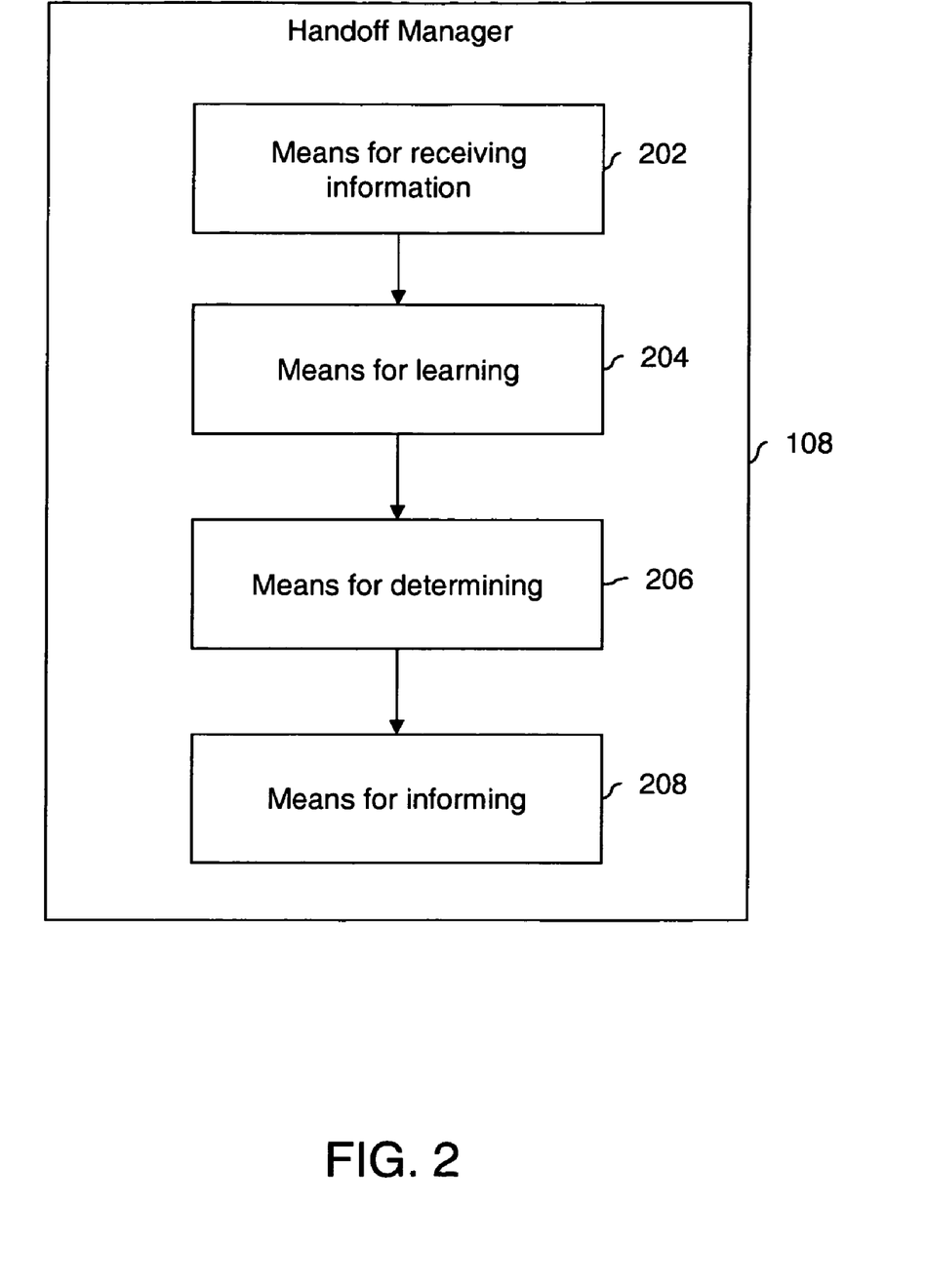
FIG. 2 is a block diagram of a handoff manager, in accordance with an exemplary embodiment of the present invention.

FIG. 2 is a block diagram of the handoff manager 108, in accordance with an exemplary embodiment of the present invention. The handoff manager 108 is a system, which enables a mobile node to handoff from a first access point in the mobile network 100. The handoff manager 108 includes a means for receiving information 202, a means for learning 204, a means for determining 206 and a means for informing 208.

The means for receiving information 202 receives information about the position and movement of the plurality of mobile nodes 102 in the geographic area 110. In an embodiment of the present invention, the means for receiving information 202 receives information about the velocity of the plurality of mobile nodes 102. The means for receiving information 202 also gets information regarding RSS and signal to noise ratio (SNR) at each of the plurality of mobile nodes 102 in the geographic area 110. Further, the means for receiving information 202 maintains information about the position of the plurality of access points 104 in the geographic area 110. In an embodiment of the invention, the means for receiving information 202 receives information about a second position for a mobile node. The second position is the position where the mobile node handoffs.

The means for learning 204 maps the information received by the means for receiving information 202 to the geographic location of the respective mobile nodes to form a coverage map. A coverage map is described in detail in conjunction with FIG. 3. The handoff manager 108 learns the coverage capabilities of the plurality of access points 104 in the geographic area 110 using the mapped information. The mapped information is then used by the means for determining 206 to determine a second access point to which a mobile node will handoff. The means for informing 208 then informs the mobile node about the second access point. In an embodiment of the present invention, the means for informing 208 informs the mobile node about the predicted position, e.g. the handoff-position, and the predicted time, e.g. the handoff-time, for the handoff. For example, based on the mapped information, the handoff manager 108 may predict that the mobile node 102a will handoff to a second access point, e.g. the access point 104b, after a predicted period of time. The means for informing 208 then informs the mobile node 102a and the access point 104b about the upcoming handoff.

In an embodiment of the present invention, the means for informing 208 informs the access point 104b to reserve network resources for the predicted handoff. In another embodiment of the present invention, the means for informing 208 initiates a context transfer. Initiating context transfer allows services that have already been established at the first access point, e.g. the access point 104a, to continue at the access point 104b. It may then provide necessary information such as, the frequency band, modulation technique, beacon interval, and the like about the access point 104b to the mobile node 102a. This information helps the mobile node 102a to search and establish communication with the access point 104b.

Figure 3:
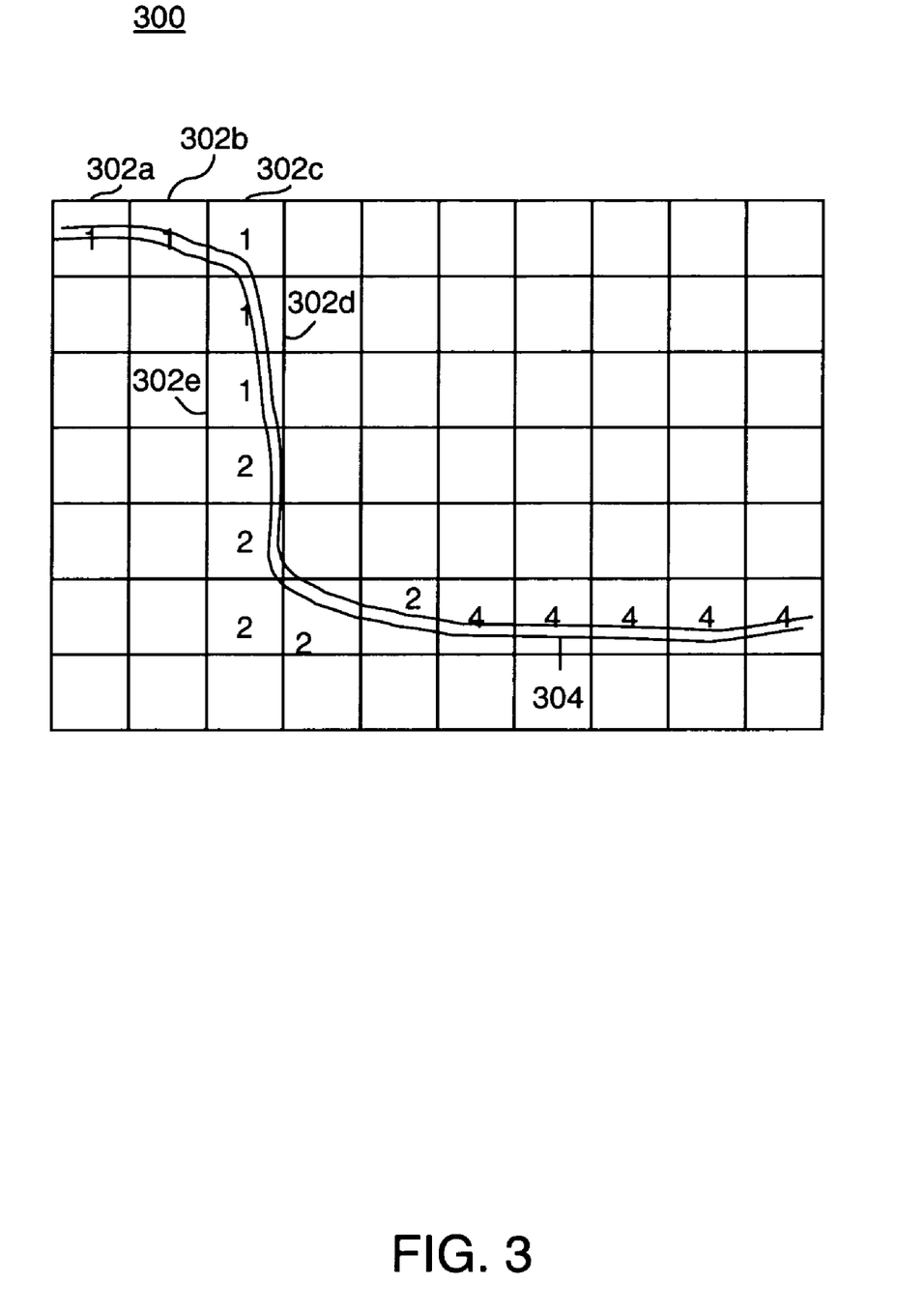
FIG. 3 is a schematic diagram of a coverage map, in accordance with an exemplary embodiment of the present invention.

FIG. 3 is a schematic diagram of a coverage map 300, in accordance with an exemplary embodiment of the present invention. The handoff manager 108 is configured with coordinates that define the boundary of the geographic area 110. In accordance with an embodiment of the present invention, the handoff manager 108 divides the geographic area 110 into a plurality of micro cells 302. Each of the plurality of mobile nodes 102 sends the geographic coordinates of its position, and the access point to which it is connected, to the handoff manager 108. For each mobile node, the handoff manager 108 determines the micro cell in which the mobile node is located based on the received geographic coordinates. As is known in the art, each mobile node can learn its geographic coordinates of its position via one of many mechanisms, such as by using a GPS receiver, triangulation, and the like.

For example, the mobile node 102b travels on a path 304 through the micro cells 302a, 302b, 302c and so on. The handoff manager 108 maps an access point, which provides coverage to the mobile node 102b in these micro cells, to the respective micro cell. This mapping results in the coverage map 300 with each of the plurality of micro cells 302 being associated with at least an access point, were the access point provides coverage to the mobile nodes in that micro cell. For example, in FIG. 3, the number "1" denote a first access point providing coverage to micro cells 302a, 302b, 302c, 302d, and 302e. Further, the number "2" denotes a second access point providing coverage to other micro cells, and the number "4" denotes another access point providing coverage to other micro cells.

In an embodiment of the present invention, the coverage map 300 has an RSS indicator for each of the access points associated with the plurality of micro cells 302. In another embodiment of the present invention, the coverage map 300 takes into account factors, such as the state of the battery, which may affect the performance of the mobile nodes. In accordance with an embodiment of the present invention, the complete coverage map 300 is built over an extended period of time.

Figure 4:
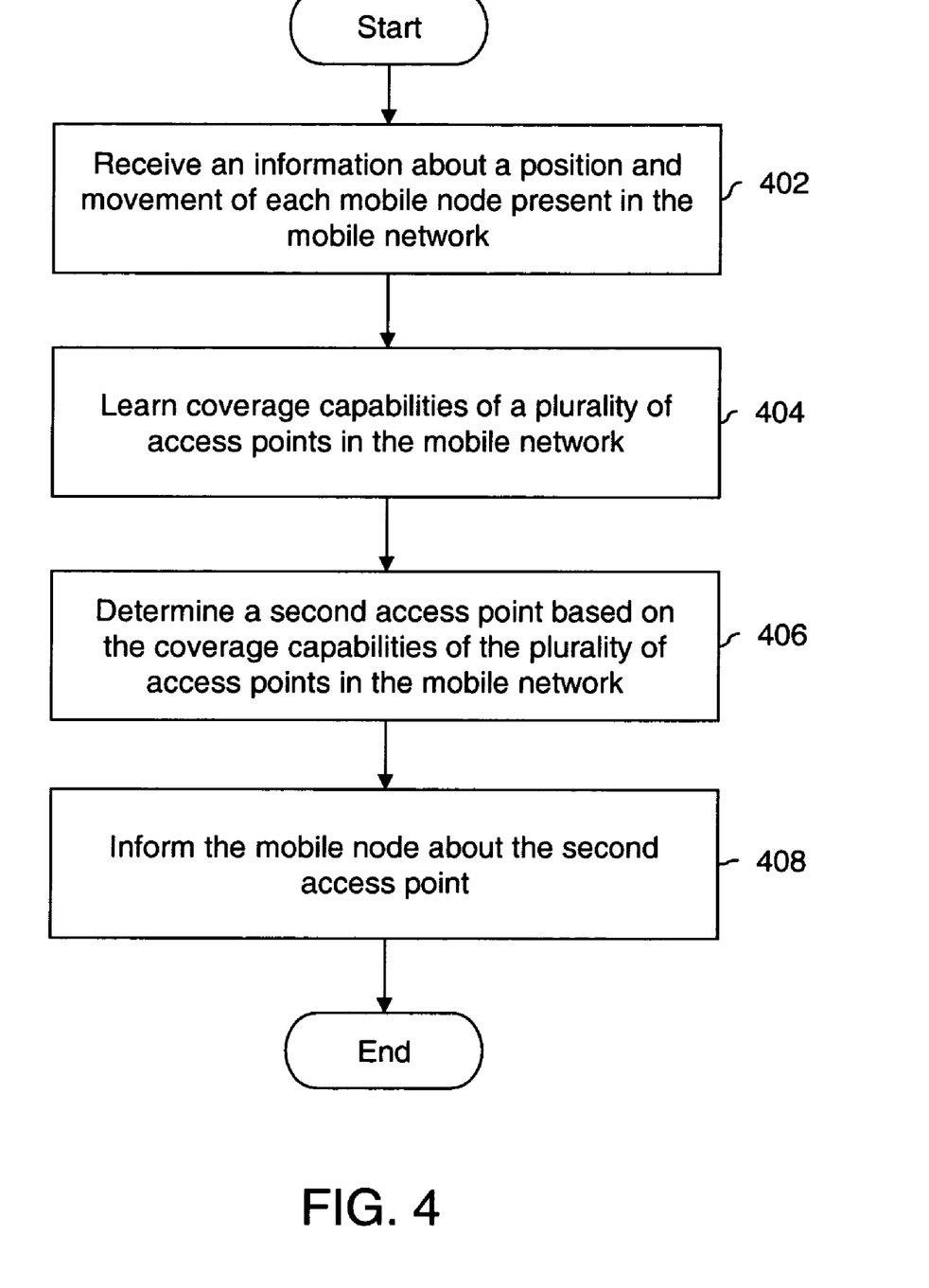
FIG. 4 is a flow chart illustrating a handoff method, in accordance with an exemplary embodiment of the present invention.

FIG. 4 is a flow chart illustrating a handoff method, in accordance with an exemplary embodiment of the present invention. At step 402, the handoff manager 108 receives information about the position and movement of the plurality of mobile nodes 102 in the geographic area 110. Additionally, the handoff manager could also receive, in conjunction with the above information, information relating to the time when the position and movement measurement was taken. In such an embodiment, the information may comprise a timestamp. In an embodiment of the present invention, the handoff manager 108 may also receive information about the velocity of the plurality of mobile nodes 102 in the geographic area 110.

At step 404, the handoff manager 108 learns the coverage capabilities of the plurality of access points 104 in the geographic area 110. In one embodiment, this is done by mapping the received information to the position of the mobile node. At step 406, the handoff manager 108 determines a second access point, e.g. access point 104b, to which a mobile node, e.g. mobile node 102a, will handoff. This determination is done using the mapped information. In an embodiment of the invention, the determination of the second access point is done using a prediction matrix. The prediction matrix of an embodiment of the present invention is described in detail in conjunction with FIG. 6.

At step 408, the handoff manager 108 informs the mobile node 102a about the access point 104b. In an embodiment of the present invention, the handoff manager 108 then initiates a context transfer. The handoff manager 108 also informs the mobile node 102a about the frequency band, modulation technique, beacon interval, and the like, in order to allow the mobile node 102a to communicate with the second access point, e.g. the access point 104b.

Figure 5:
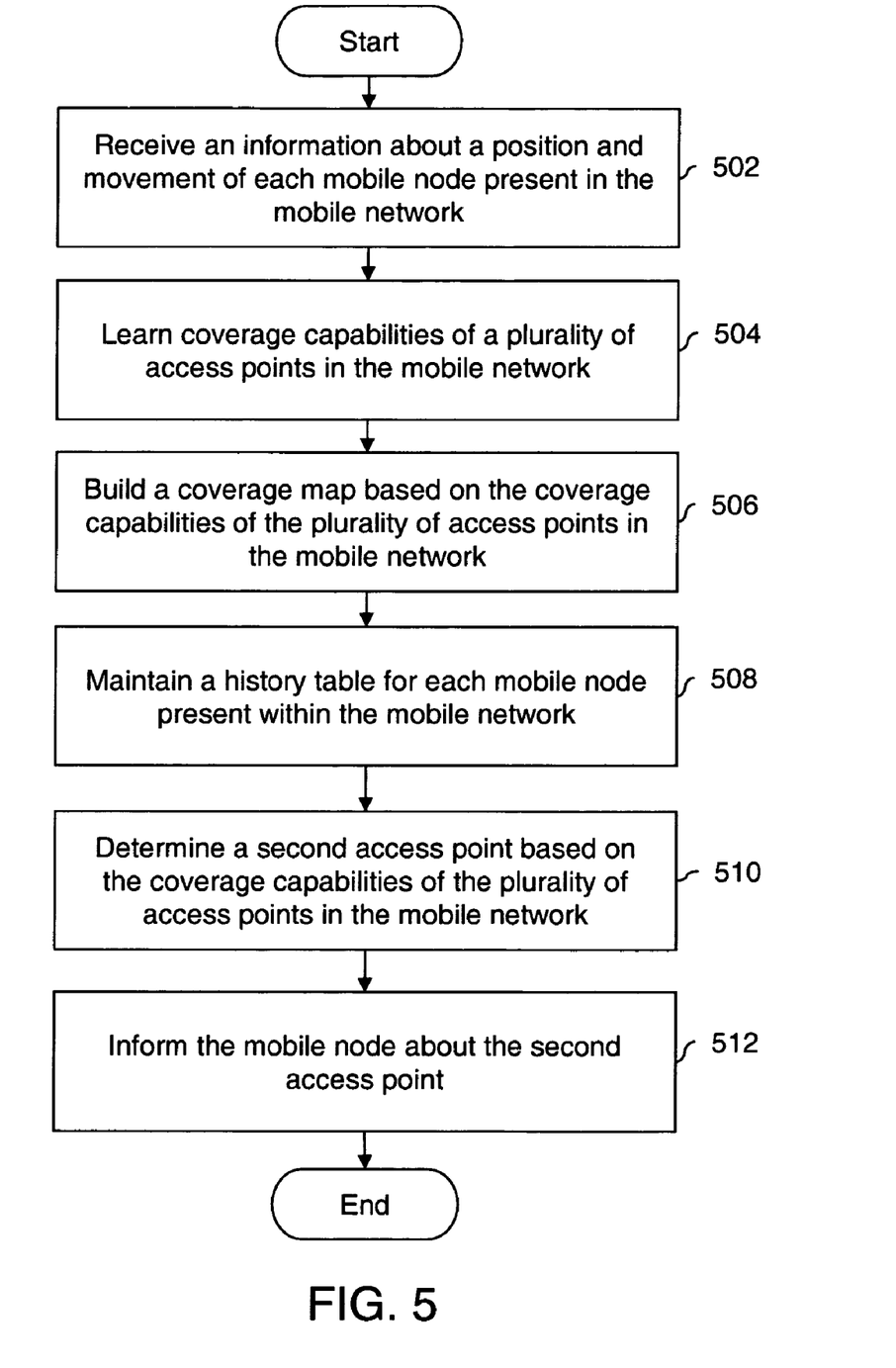
FIG. 5 is a flowchart illustrating a handoff method, in accordance with another exemplary embodiment of the present invention.

FIG. 5 is a flowchart illustrating a handoff method, in accordance with another exemplary embodiment of the present invention. At step 502, the handoff manager 108 receives the information about the position and movement of each of the plurality of mobile nodes 102 present in the geographic area 110. In an embodiment of the present invention, the handoff manager 108 receives information about the velocity of each of the plurality of mobile nodes 102 in the geographic area 110. The handoff manager 108 may also receive information regarding the RSS and/or SNR at each of the plurality of mobile nodes 102. In an embodiment of the present invention, the handoff manager 108 tracks the information about a second position of a mobile node. The second position denotes the position where a mobile node in the geographic area 110 decides to handoff on its own or via any other method that does not involve the handoff manager. The handoff manager 108 receives the information periodically by using a protocol between each of the plurality of mobile nodes 102 and the handoff manager 108. For example, the protocol may comprise each of the plurality of mobile nodes 102 periodically sending an update to the handoff manager 108 wherein the update comprises the mobile node's current position, and possibly other parameters such as the mobile node's velocity, RSS, and SNR. In an embodiment of the present invention, the frequency of the updates can vary depending upon the value and/or rate of change of the parameters. Further, the frequency of the updates can be influenced by the handoff manager 108.

At step 504, the handoff manager 108 learns the coverage capabilities of each of the plurality of access points 104 in the geographic area 110 by maintaining information about the position of each of the plurality of access points 104. At step 506, the handoff manager 108 builds the coverage map 300 using the received information (as described in conjunction with FIG. 3). At step 508, the handoff manager 108 creates and maintains a history table for each of the plurality of mobile nodes 102 in the geographic area 110. The history table indicates the recent locations visited by each of the plurality of mobile nodes 102 in the geographic area 110. In an embodiment, the number of locations kept in the history table is fixed. Alternatively, the number of locations kept in the history table may vary based on the number of alternate paths the mobile node can take on a given route. Further, the number of locations kept in the history table can vary based on the granularity of the coverage map. In an embodiment of the present invention, the number of locations, indicated in the history table for each of the plurality of mobile nodes 102 is at least two. Each time a mobile node sends information about its location to the handoff manager 108 the history table is updated and the oldest location for the mobile node in the history table is deleted. Further, the information about other locations is shifted and the current location of the mobile node is added in the history table.

For example, if the mobile node 102b travels on the path 304 through the micro cells 302a, 302b, 302c and then to 302d, the history table will have this set of micro cells in a row corresponding to the mobile node 102b. Here, the number of locations indicated in the history table is four. The mobile node 102b then moves to a micro cell 302e. The handoff manager 108 removes the oldest location, e.g. the micro cell 302a, from the history table. The handoff manager 108 marks the other three micro cells as the previous locations of the mobile node 102b. The handoff manager 108 then marks the micro cell 302e as the current location of the mobile node 102b. In an embodiment of the present invention, updating the history table is done every time information is received from a mobile node in the geographic area 110.

At step 510, the handoff manager 108 determines a second access point to which a mobile node, for example the mobile node 102a will handoff. In various embodiments of the present invention, the handoff manager 108 uses a prediction matrix for determining the second access point, the handoff-position and the handoff-time. The prediction matrix is described in detail in conjunction with FIG. 6. The handoff manager 108 also predicts a handoff-position and a handoff-time. The handoff-position is the position at which handoff is predicted to occur. The handoff-time is the time at which handoff is predicted to occur. The handoff-position and the handoff-time can be calculated based on standard techniques, taking into account the location and the time that measurements were received. For example, as mentioned above, if the handoff manager 108 received the time along with received information about position and movement from the mobile node, the handoff manager 108 could calculate the handoff-position and the handoff-time from the received information. At step 512, the handoff manager 108 informs the mobile node 102a about the second access point. The handoff manager 108 may also inform the mobile node 102a about the handoff-position and the handoff-time.

In an embodiment of the present invention, the handoff manager 108 initiates a context transfer. It may also inform the mobile node 102a about the frequency band, modulation technique, beacon interval, and the like, so as to allow the mobile node 102a to communicate with the second access point.

Figure 6:
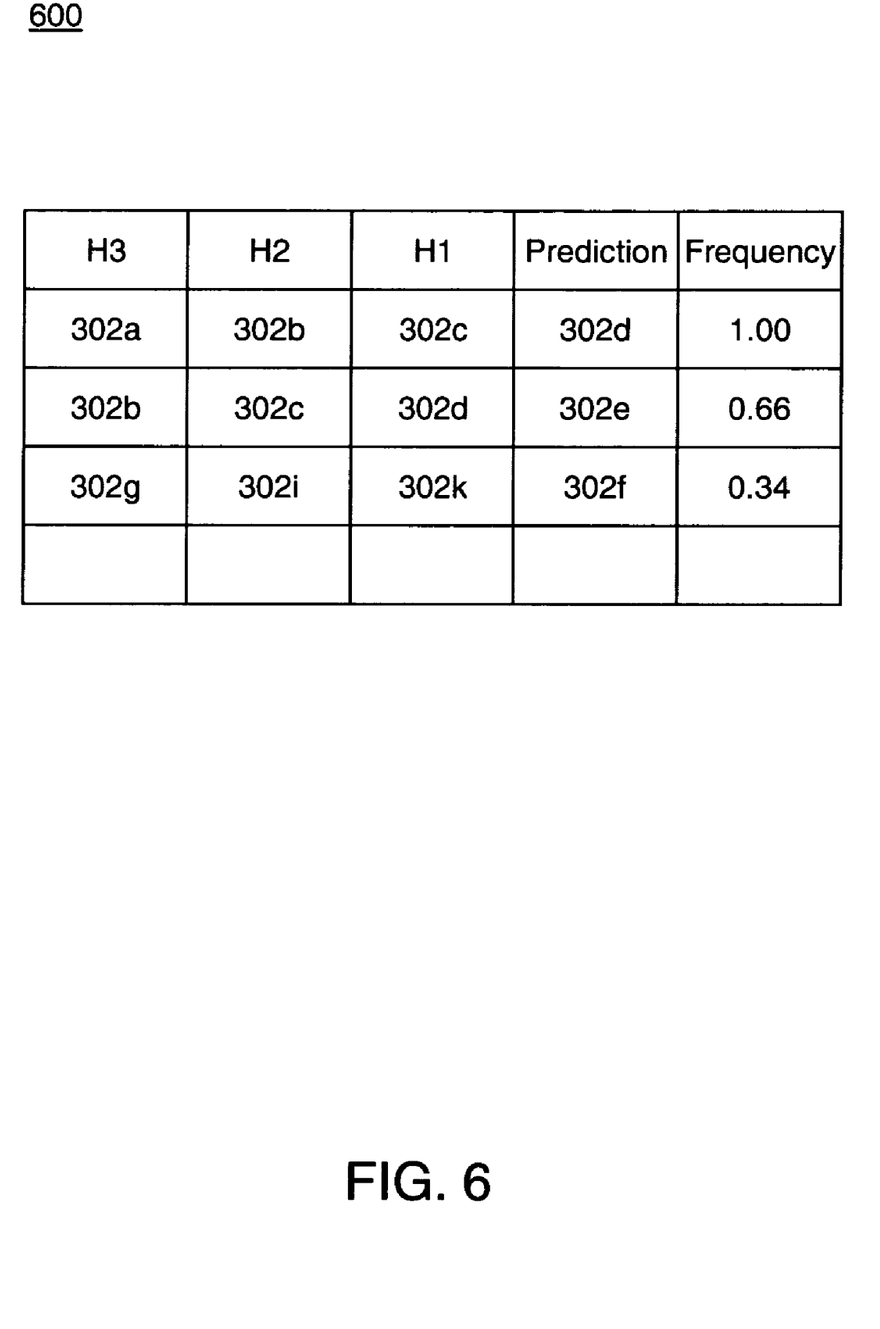
FIG. 6 is a block diagram illustrating a prediction matrix, in accordance with an exemplary embodiment of the present invention.

FIG. 6 illustrates a prediction matrix 600, in accordance with an exemplary embodiment of the present invention. The handoff manager 108 creates and updates the prediction matrix 600 using the information from the history table. The prediction matrix 600 is used for determining a second access point to which a mobile node, for example the mobile node 102a, will handoff. The prediction matrix 600 includes a plurality of rows. Each row contains a set of previous locations. Each row further has a predicted location, which specifies the micro cell in which a mobile node may enter if it has followed the set of previous locations. Each row also specifies a frequency, which is the probability of entering the predicted micro cell for the mobile node.

Each time the history table is updated, the handoff manager 108 searches the rows of the prediction matrix 600 for the set of previous locations. For example, based on the information received from the mobile node 102b, the history table is updated. The micro cells 302b, 302c, and 302d are added to the history table as the set of previous locations for the mobile node 102b. The micro cell 302e is added to the history table as the current location. Now, the handoff manager 108 searches the existing rows of the prediction matrix 600 for the set of previous locations reported by the mobile node 102b. Based on the result of the search, the handoff manager 108 may perform one of the following actions.

If the set of previous locations does not exist in the existing rows, a new row with this set of previous locations is added to the prediction matrix 600. Further, the current location of the mobile node 102b, e.g., the micro cell 302e is stored as the predicted location in the prediction matrix 600. The frequency of a mobile node entering the micro cell 302e, if it has followed the set of previous locations, is one.

If a single entry exists for the set of previous locations in the prediction matrix 600, and the predicted location is the micro cell 302e, no changes are made in the prediction matrix 600. The frequency also remains unchanged.

If a single entry for the set of previous locations exists in the prediction matrix 600, but the predicted location is a micro cell other than the micro cell 302e, a new row is added. The new frequencies for both these rows are calculated using already known techniques, such as weighted averaging.

If multiple entries for the set of previous locations exist in the prediction matrix 600 and the predicted location for one of them is the micro cell 302e, no new row is added and the existing frequencies are recalculated.

If for the multiple entries; none of the predicted locations contains the micro cell 302e, a new row with this predicted location is added, and the frequencies are recalculated.

While determining a predicted location for a mobile node, the handoff manager 108 matches the older locations of the mobile node with the existing rows in the prediction matrix 600. If a corresponding entry exists, the handoff manager 108 determines the predicted micro cell, and the probability of the mobile node moving into the predicted micro cell. It then uses the coverage map to determine a second access point, which provides service in the predicted micro cell. If a different access point provides service in the predicated micro cell, the handoff manager 108 reserves the resources at the second access point and informs the mobile node that a handoff is imminent. In case of multiple possibilities, the handoff manager 108 can notify all or a subset of the predicted access points to reserve the resources for the handoff. In an embodiment of the present invention, the subset may be determined by only selecting those which have greater than a certain probability threshold. It may then notify the mobile node that a handoff to one of the predicted access points is imminent.

In an embodiment of the present invention, the handoff manager 108 may instruct a mobile node to report its location more often as the mobile node approaches the edge of its current micro cell. The handoff manager 108 may do so in cases where the number of predicted access points is more than one. This helps the handoff manager 108 to decide the second access point with more accuracy.

In an embodiment of the present invention, additional information may be added in the prediction matrix 600 to assist the handoff manager 108 in the calculation of frequencies. For example, prediction accuracy can be improved by adding mobile node identification information to the coverage map and the prediction matrix, e.g. a model number or a serial number of the mobile node. Adding such identification information would allow separate determination of system coverage capabilities for each mobile model and/or for specific mobile devices as identified by their serial number. Additionally prediction accuracy may be improved by adding raw counts of handover, not just averages of handovers, time between handovers, duration of mobile node in a micro cell, and other such similar factors.

It should be clear from the preceding disclosure that the invention provides a method of handoff, which enables a smooth handoff due to the coordination provided by the handoff manager 108. Further, the handoff manager 108 requires very little configuration and maintenance. It is self-learning, and updates itself periodically with changes in the coverage capabilities of the existing access points. In addition, the method of handoff is scalable, as any number of handoff managers, each with a limited area of control, can be implemented in a mobile network 100. Further, in case of failure of the handoff manager 108, the mobile nodes can revert back to the traditional handoff mechanisms.

It will be appreciated the handoff technique described herein may be comprised of one or more conventional processors and unique stored program instructions that control the one or more processors to implement some, most, or all of the functions described herein; as such, the functions of learning coverage capabilities and determining an access point may be interpreted as being steps of a method. Alternatively, the same functions could be implemented by a state machine that has no stored program instructions, in which each function or some combinations of certain portions of the functions are implemented as custom logic. A combination of the two approaches could be used. Thus, methods and means for performing these functions have been described herein.

While the principles of the invention have been described above in connection with specific apparatus, it is to be clearly understood that this description is made only by way of example and not as a limitation on the scope of the invention.

This disclosure is intended to elaborate on how to fashion and use various embodiments, in accordance with the invention, rather than limit the true, intended, fair scope and spirit thereof. The foregoing description is not intended to be exhaustive or limit the invention to the precise forms disclosed. Modifications or variations are possible in light of the above teachings. The embodiment was chosen and described, to provide the best illustration of the principles of the invention and its practical application to enable one with ordinary skill in the art to utilize the invention in various embodiments and with various modifications, as are suited to the particular use contemplated. All such modifications and variations are within the scope of the invention, as determined by the appended claims, which may be amended during the pendency of this application for patent, and all equivalents thereof, when interpreted in accordance with the breadth to which they are fairly, legally and equitably entitled.

What is claimed is:

1. A method of enabling a mobile node to handoff from a first access point in a mobile network, the mobile network enabling communication between a plurality of mobile nodes, the method comprising:
   receiving information about a position and movement of the mobile node;
   learning coverage capabilities of a plurality of access points in the mobile network, wherein the information about the position and movement of the mobile node is utilized for learning the coverage capabilities;
   dividing the mobile network into a plurality of micro cells, each access point servicing a cell, each cell containing multiple micro cell;
   mapping each micro to at least one access point;
   instructing the mobile node to report its location more frequently as the mobile node approaches an edge of a current micro cell in which the mobile node is currently located;
   determining a second access point based on the coverage capabilities of the plurality of access points in the mobile network; and
   informing the mobile node about the second access point, wherein the mobile node makes a handoff to the second access point.

2. The method according to claim 1, wherein the information about the movement of the mobile node comprises information about a velocity of the mobile node.

3. The method according to claim 1 further comprising:
   receiving information about a second position of the mobile node, wherein the mobile node decides to handoff at the second position;
   mapping the information about the second position of the mobile node to a geographic location of the mobile node.

4. The method according to claim 1 further comprising:
   receiving information about Received Signal Strength (RSS) and Signal to Noise Ratio (SNR) of the mobile node; and
   mapping the information about RSS and SNR of the mobile node to a geographic location of the mobile node.

5. The method according to claim 1 further comprising:
   predicting at least one of a handoff-position and a handoff-time, wherein the mobile node makes a handoff to the second access point at the handoff-position and the handoff-time; and
   informing at least one of the handoff-position and the handoff-time to the mobile node.

6. The method according to claim 1 wherein the second access point is determined from a number of predicted access points to which the mobile node could be handed-off from the current micro cell, the number of predicted access points able to be different from the number of the plurality of access points, the mobile node instructed to report its location more frequently only for micro cells in which the number of predicted access points is greater than one.

7. The method according to claim 1 wherein the second access point is determined from a number of predicted access points to which the mobile node could be handed-off from the current micro cell, the number of predicted access points able to be different from the number of the plurality of access points, the method further comprising notifying at least some of the predicted access points to reserve resources for the handoff prior to determination of the second access point.

8. The method according to claim 7 wherein only the predicted access points that each have a probability of servicing the mobile node after the mobile node has exited the current micro cell greater than a predetermined threshold are notified, the probability determined using a history of handoffs of the mobile node from the current micro cell.

9. The method according to claim 1 further comprising receiving updates of the position and movement of the mobile node from the mobile node, the updates varying in frequency depending on at least one of a value or rate of change of a parameter of the mobile node, the parameter including at least one of a position, RSS or SNR of the mobile node.

10. The method according to claim 9 further comprising:
predicting at least one of a handoff-position and a handoff-time based on the prediction matrix, wherein the mobile node makes a handoff to the second access point at the handoff-position and the handoff-time; and
informing at least one of the handoff-position and the handoff-time to the mobile node.

11. A method of enabling a mobile node to handoff from a first access point in a mobile network, the mobile network enabling communication between a plurality of mobile nodes, the method comprising:
receiving information about a position and movement of each mobile node present in the mobile network;
learning coverage capabilities of a plurality of access points in the mobile network, wherein the information about the position and movement of each mobile node is utilized for learning the coverage capabilities;
building a coverage map based on the coverage capabilities of the plurality of access points in the mobile network;
maintaining a history table for each mobile node present within the mobile network, the history table indicating recent locations visited by the mobile node;
determining a second access point based on the history table; and
informing the mobile node about the second access point, wherein the mobile node makes a handoff to the second access point.

12. The method according to claim 11 further comprising adding at least one of model number or serial number of each mobile device to the coverage map to enable separate determination of the coverage capabilities for each of the model number or specific mobile device.

13. The method according to claim 11 further comprising:
receiving information about a second position of the mobile node, wherein the mobile node decides to handoff at the second position; and
mapping the information about the second position of the mobile node to a geographic location of the mobile node.

14. The method according to claim 11 further comprising:
receiving information about RSS and SNR of the mobile node at a second position of the mobile node; and
mapping the information about RSS and SNR of the mobile node to a geographic location of the mobile node.

15. The method according to claim 11, wherein building the coverage map comprises:
dividing the mobile network into a plurality of micro cells;
mapping each mobile node into a micro cell; and
mapping each micro cell to at least one access point, the at least one access point providing coverage to the mobile node present in the micro cell,
wherein each access point sevices a cell and each cell contains multiple micro cells.

16. The method according to claim 15, wherein an RSS indicator exists for each access point in the micro cell.

17. The method according to claim 11 further comprising:
populating a prediction matrix using the recent locations in the history table, the prediction matrix containing:
sets of previous locations visited by the mobile node,
for each set of previous locations: a predicted location in which it is possible that the mobile node may enter if it has followed the set of previous locations, and
for each predicted location: a probability of the mobile node entering the predicted location; and
employing the prediction matrix to determine the second access point.

18. The method according to claim 17 wherein when the mobile device reaches a current location in which multiple predicted locations exist at least two of which have a predicted access point different from the first access point such that it is possible for the mobile device to be handed off to multiple different predicted access points, the method further comprises notifying at least some of the predicted access points to reserve resources for the handoff prior to determination of the second access point.

19. The method according to claim 18 wherein only the predicted access points that each have a probability of servicing the mobile node after the mobile node has exited the current location greater than a predetermined threshold are notified.

20. The method according to claim 11 further comprising instructing the mobile node to report its location more frequently as the mobile node approaches an edge of a predetermined area in which the mobile node is currently located.

21. The method according to claim 11 further comprising receiving updates of the position and movement of the mobile node from the mobile node, the updates varying in frequency depending on at least one of a value or rate of change of a parameter of the mobile node, the parameter including at least one of a position, RSS or SNR of the mobile node.

22. The method according to claim 11 wherein the granularity of the coverage map varies and the number of locations maintained in the history table varies based on the granularity of the coverage map.

* * * * *

UNITED STATES PATENT AND TRADEMARK OFFICE
CERTIFICATE OF CORRECTION

| | | |
|---|---|---|
| PATENT NO. | : 7,697,479 B2 | Page 1 of 1 |
| APPLICATION NO. | : 11/100754 | |
| DATED | : April 13, 2010 | |
| INVENTOR(S) | : Metke et al. | |

It is certified that error appears in the above-identified patent and that said Letters Patent is hereby corrected as shown below:

1. In Column 10, Line 15, in Claim 15, delete "sevices" and insert -- services --, therefor.

Signed and Sealed this
Fifth Day of June, 2012

David J. Kappos
*Director of the United States Patent and Trademark Office*